United States Patent
Abe et al.

(10) Patent No.: US 7,900,036 B2
(45) Date of Patent: Mar. 1, 2011

(54) SYSTEM AND METHOD FOR IMPLEMENTING BOOT/RECOVERY ON A DATA PROCESSING SYSEM

(75) Inventors: Atsushi Abe, Fujisawa (JP); Tomoaki Kimura, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/938,842

(22) Filed: Nov. 13, 2007

(65) Prior Publication Data

US 2008/0148038 A1    Jun. 19, 2008

(30) Foreign Application Priority Data

Dec. 18, 2006   (JP) .................................. 2006-340224

(51) Int. Cl.
*G06F 9/00* (2006.01)
*G06F 9/24* (2006.01)
*G06F 11/00* (2006.01)
*G06F 15/177* (2006.01)

(52) U.S. Cl. .............. 713/2; 713/1; 714/5; 714/6; 714/7; 714/15; 714/36

(58) Field of Classification Search .................. 713/1, 2; 714/5, 6, 7, 15, 36
See application file for complete search history.

(56) References Cited

U.S. PATENT DOCUMENTS

| | | | | |
|---|---|---|---|---|
| 5,793,943 A * | 8/1998 | Noll | | 714/6 |
| 5,835,695 A | 11/1998 | Noll | | |
| 6,308,265 B1 * | 10/2001 | Miller | | 713/2 |
| 6,754,818 B1 * | 6/2004 | Lee et al. | | 713/2 |
| 6,757,838 B1 * | 6/2004 | Chaiken et al. | | 714/5 |
| 6,892,323 B2 * | 5/2005 | Lin | | 714/36 |
| 7,007,159 B2 * | 2/2006 | Wyatt | | 713/1 |
| 7,100,087 B2 * | 8/2006 | Yang et al. | | 714/36 |
| 7,318,173 B1 * | 1/2008 | Falik et al. | | 714/36 |
| 2003/0005277 A1 * | 1/2003 | Harding et al. | | 713/2 |
| 2003/0120907 A1 * | 6/2003 | Tang | | 713/1 |
| 2003/0149852 A1 * | 8/2003 | Kang | | 711/164 |
| 2004/0193862 A1 * | 9/2004 | Lin | | 713/1 |
| 2004/0268116 A1 * | 12/2004 | Vasisht et al. | | 713/100 |
| 2005/0273588 A1 * | 12/2005 | Ong et al. | | 713/2 |
| 2007/0033390 A1 * | 2/2007 | Chang et al. | | 713/2 |
| 2007/0136638 A1 * | 6/2007 | Lee | | 714/758 |

FOREIGN PATENT DOCUMENTS

| | | |
|---|---|---|
| JP | 61-061299 | 3/1986 |
| JP | 05-028056 | 2/1993 |
| JP | 2000-148467 | 5/2000 |
| JP | 2000-163268 | 6/2000 |
| JP | 2004-013719 | 1/2004 |
| JP | 2004-038529 | 2/2004 |

* cited by examiner

*Primary Examiner* — Mark Connolly
(74) *Attorney, Agent, or Firm* — Dillon & Yudell LLP

(57) ABSTRACT

A system and method for implementing a boot recovery on a data processing system. According to an embodiment of the present invention, at least one processor compares contents of a first read-only memory (ROM) image and a second ROM image outputted from a memory. The first ROM image is initially selected to boot a data processing system utilizing a first basic input output system (BIOS) program. In response to determining that contents of the first ROM image and the second ROM image are different, the second ROM image is selected. The data processing system boots utilizing the second BIOS program stored by the second ROM image.

11 Claims, 12 Drawing Sheets

FIG. 12
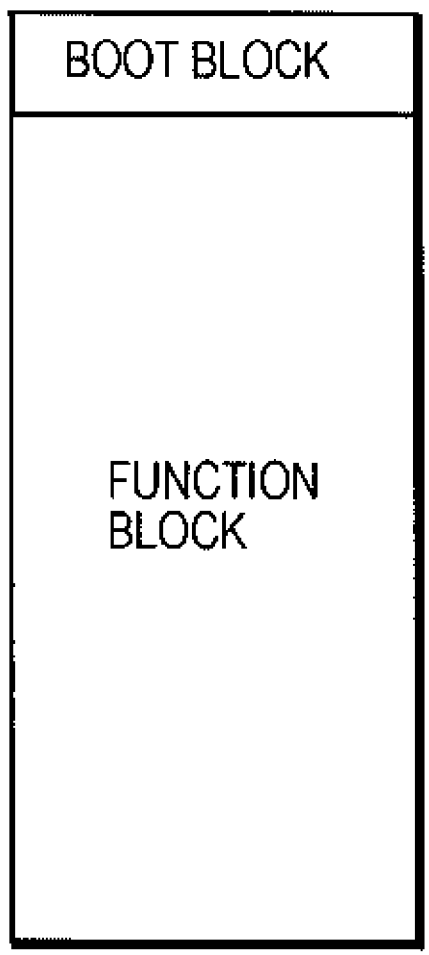
(a)
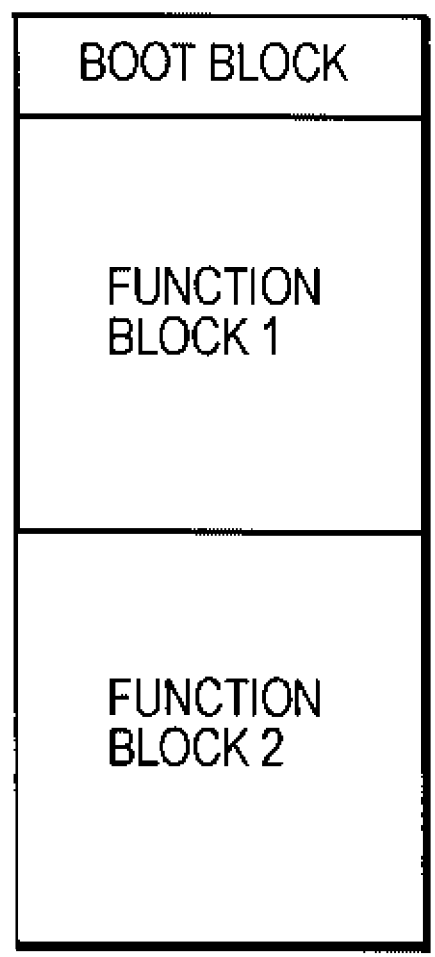
(b)

SYSTEM AND METHOD FOR IMPLEMENTING BOOT/RECOVERY ON A DATA PROCESSING SYSEM

PRIORITY CLAIM

This application claims priority of Japanese Patent Application No. 2006-340224 filed on Dec. 18, 2006, and entitled, "Information Processing System and Boot-Recovery Method Thereof."

BACKGROUND OF THE INVENTION

1. Technical Field

This invention relates to a data processing system such as a personal computer. In particular, the invention relates to an information processing system including multiple read-only memory (ROM) images each storing a basic input output system (BIOS) program for executing initialization and so forth during a boot.

2. Description of the Related Art

A BIOS program generally includes a BIOS main body (core block) for executing initialization of various types of devices, loading of an operating system (OS), and so forth and a boot block that boots up immediately after a computer is turned on or reset to execute a cyclic redundancy check (CRC) or the like to detect an error and returns control to the BIOS main body if there is no problem. The BIOS program's failure in operating normally prevents the computer from booting up, so some configurations have been adopted to cope with such failure.

In general, a central processing unit (CPU) reads and executes an instruction from an address set up in a program counter. When the power is turned on, the program counter is set to a default, which typically refers to the top of an initialization code in a ROM. Incidentally, writable flash ROMs have often been used as ROMs in recent years. This is advantageous in that a flash memory can be rewritten without having it to be removed even if a problem has occurred in a program.

Corruption or erasure of an initialization code per se in a flash ROM prevents the system from booting up. Therefore, the initialization code is handled in a special manner as a boot block in the flash ROM, and its rewriting is restrained as much as possible. For this reason, the initialization code stored in the boot block is generally programmed so as to be processed independently of a function block. Upon completing initialization of the system, the initialization code transfers control to the function block and the system performs ordinary processes.

FIGS. 12(*a*) and 12(*b*) each show an example of a flash ROM including a boot block. A boot block is typically disposed from a memory address of 0 and a function block is disposed in a subsequent address. This disposition may vary depending on the type of a CPU used in an information processing (computer) system. The examples shown in FIGS. 12(*a*) and 12(*b*) each have only one boot block. On the other hand, the example shown in FIG. 12(*a*) has one function block and the example shown in FIG. 12(*b*) has two function blocks. If there are multiple function blocks, for example, two function blocks as shown in FIG. 12(*b*), a function block 1 includes a new function code and a function block 2 includes the preceding function code. The older function code in the function block 2 is rewritten at the subsequent rewriting.

SUMMARY OF THE INVENTION

The present invention includes a system and method for implementing a boot recovery on a data processing system. According to an embodiment of the present invention, at least one processor compares contents of a first read-only memory (ROM) image and a second ROM image outputted from a memory. The first ROM image is initially selected to boot a data processing system utilizing a first basic input output system (BIOS) program. In response to determining that contents of the first ROM image and the second ROM image are different, the second ROM image is selected. The data processing system boots utilizing the second BIOS program stored by the second ROM image.

BRIEF DESCRIPTION OF THE FIGURES

FIGS. 12(*a*) and (*b*) each show an example of a ROM image storing a BIOS program according to related art. FIG. 12(*a*) is an example of a ROM image having a single functional block and FIG. 12(*b*) is an example of a ROM image having multiple functional blocks.

DETAILED DESCRIPTION OF AN ILLUSTRATIVE EMBODIMENT

Figure 1:
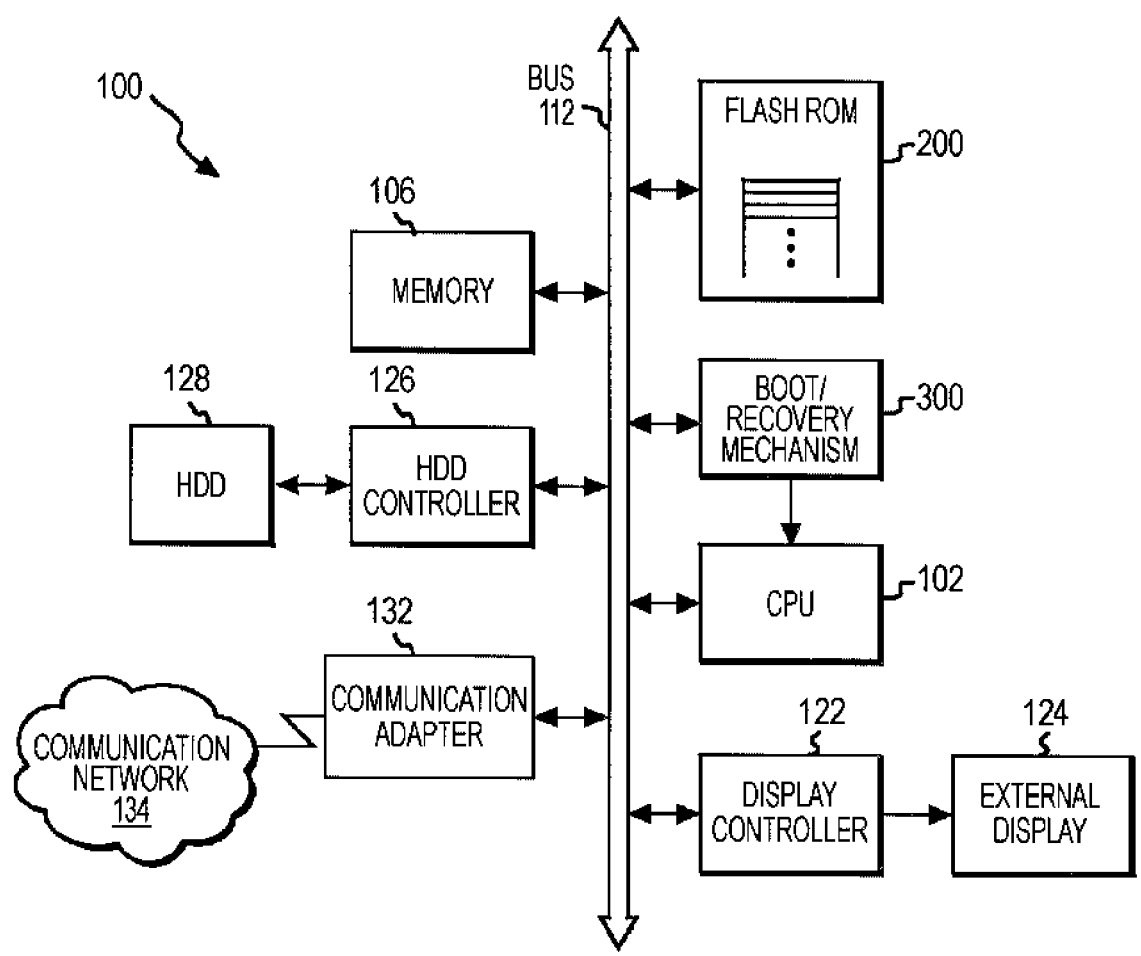
FIG. 1 is a diagram showing the overall configuration of a data processing system according to this invention.

FIG. 1 shows a data processing system 100 having boot/recovery functions of normally booting or starting up the system even if a ROM image storing a BIOS program has a problem or failure, and recovering the damaged ROM image. The data processing system 100 includes a CPU 102, a ROM 200 that includes multiple ROM images each storing a BIOS program, a memory 106 that includes a RAM and an NVRAM, and a boot/recovery mechanism 300 according to this invention. All these components are coupled to a system bus 112. The boot/recovery mechanism 300 will be described in detail later. The NVRAM retains information even after the system 100 is powered off. Also coupled to the system bus 112 are an external display 124 via a display controller 122 as an input/output controller, and a hard disk drive (HDD) 128 as an auxiliary storage device via an HDD controller 126. The storage media such as the ROM 200 and HDD 128 are allowed to store the code of a computer program for giving instructions to the CPU 102 in collaboration with an operating system (OS) so as to implement this invention, as well as to store various types of data. The system bus 112 can also be coupled to a communication network 134 via a communication adapter 132.

At power-on of the data processing system 100, the CPU 102 sets up its operation parameters (many of them are stored in the memory 106), initializes the memory 106, executes inspection and initialization of system components, and boots the operating system before starting usual user operations. When power is supplied to the data processing system 100, the CPU 102 as a system processor begins to execute a part of a BIOS program called "power on reset (POR)."

The CPU 102 controls the entire data processing system according to the code of a computer program written to the memory 106. Also, the CPU 102 is made accessible to the memory 106 or the like according to data on the BIOS program stored in the ROM 200 at a boot. The ROM 200 is preferably a programmable flash ROM. A flash ROM is a memory that is readable and writable and whose content is retained even at power-off. It stores BIOS data to be used to perform a process such as setup of an input-output device of a data processing system (also referred to as a "computer system") at a boot of the system.

Figure 2:
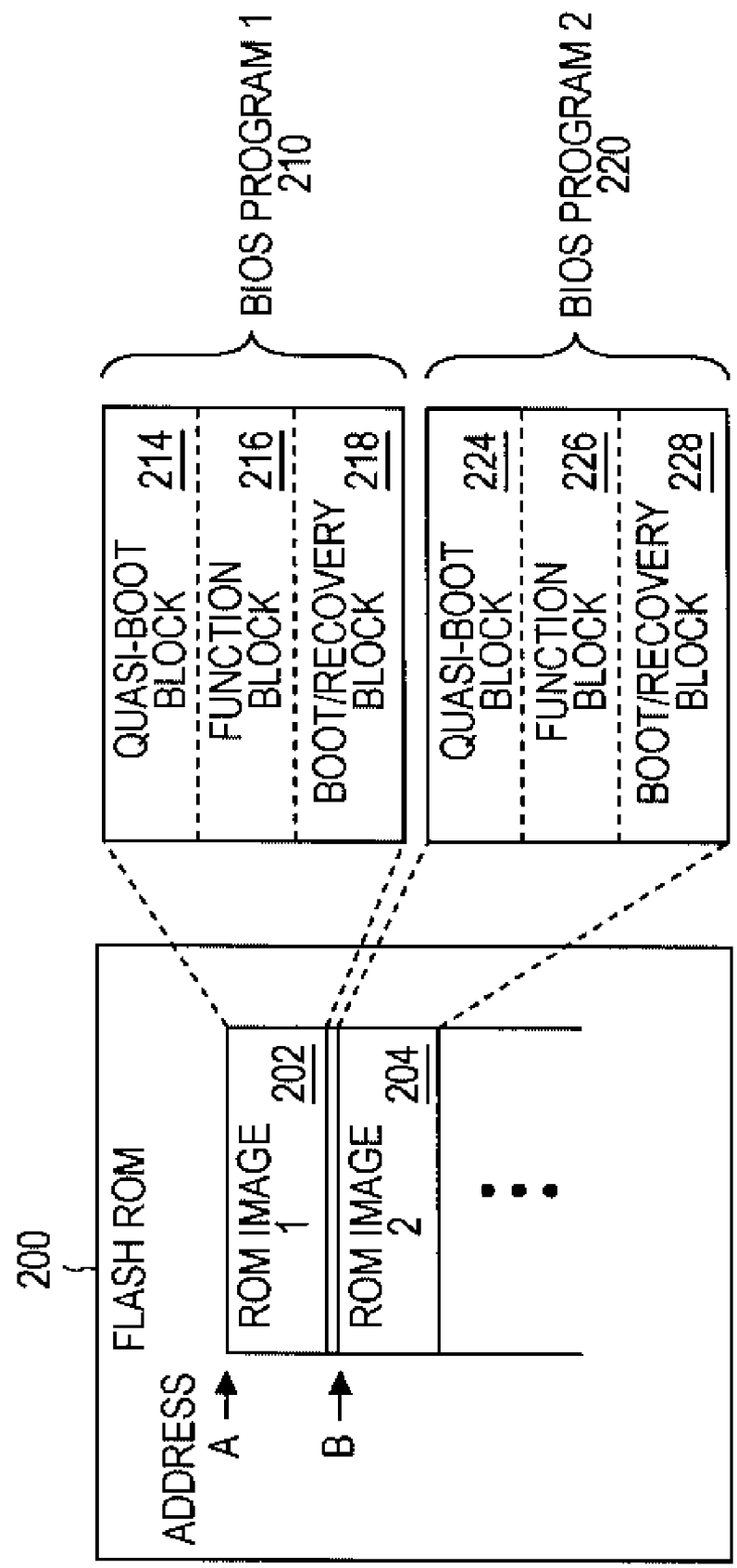
FIG. 2 is a diagram showing an ROM image in a flash ROM.

The ROM 200 will now be described using a flash ROM. FIG. 2 shows details of flash ROM 200 including multiple (two in FIG. 2) BIOS programs. A data block that is stored in a flash ROM and has a start address and includes an executable program code and data, as a whole, is called a "ROM image." In general, a ROM image is stored in a memory such as a ROM, a programmable read-only memory (PROM), or an erasable programmable read-only memory (EPROM), and includes a file, an executable program code, or data. The ROM 200 includes multiple ROM images that are rewritable and bootable. A ROM image 1 202 and a ROM image 2 204 shown in FIG. 2 have identical capacities and store identical contents when they are normal. In other words, the ROM image 2 is a replica or copy of the ROM image 1. In the address space of the ROM, the ROM image 1 is stored from a start (upper part) address A and the ROM image 2 is stored from a start (lower part) address B.

As shown in FIG. 2, the ROM image 1 202 includes a BIOS program 1 210. The BIOS program 1 210 includes: (1) a rewritable quasi-boot block 214 (called a "quasi-boot block" because it performs an identical function to an ordinary boot block but is different from an ordinary boot program in that it is rewritten) that includes the code of an initialization program to be read initially by CPU 102 at a boot, (2) a function block 216 that includes initialization data for a peripheral device such as memory 106, and (3) a boot/recovery block 218 that stores a program code (for example, a program code for comparing ROM images) for performing the boot/recovery function according to this invention. On the other hand, an ordinary BIOS program includes a boot block and a function block(s) (see FIGS. 12(a) and 12(b)). The ROM image 2 204 is a replica of the ROM image 1 202 and includes BIOS program 2 220 that has the same content as BIOS 1 210 when the ROM image 2 204 is normal. Specifically, a BIOS program 2 220 includes a quasi-boot block 224, a function block 226, and a boot/recovery block 228 that are identical to the blocks in the BIOS program 1 210 when the BIOS program 2 220 is normal. In FIG. 2, multiple ROM images is stored in one ROM; however, the ROM images may be separately stored in different multiple ROM devices. A case in which multiple ROM images are stored in a ROM will be described below.

Figure 3:
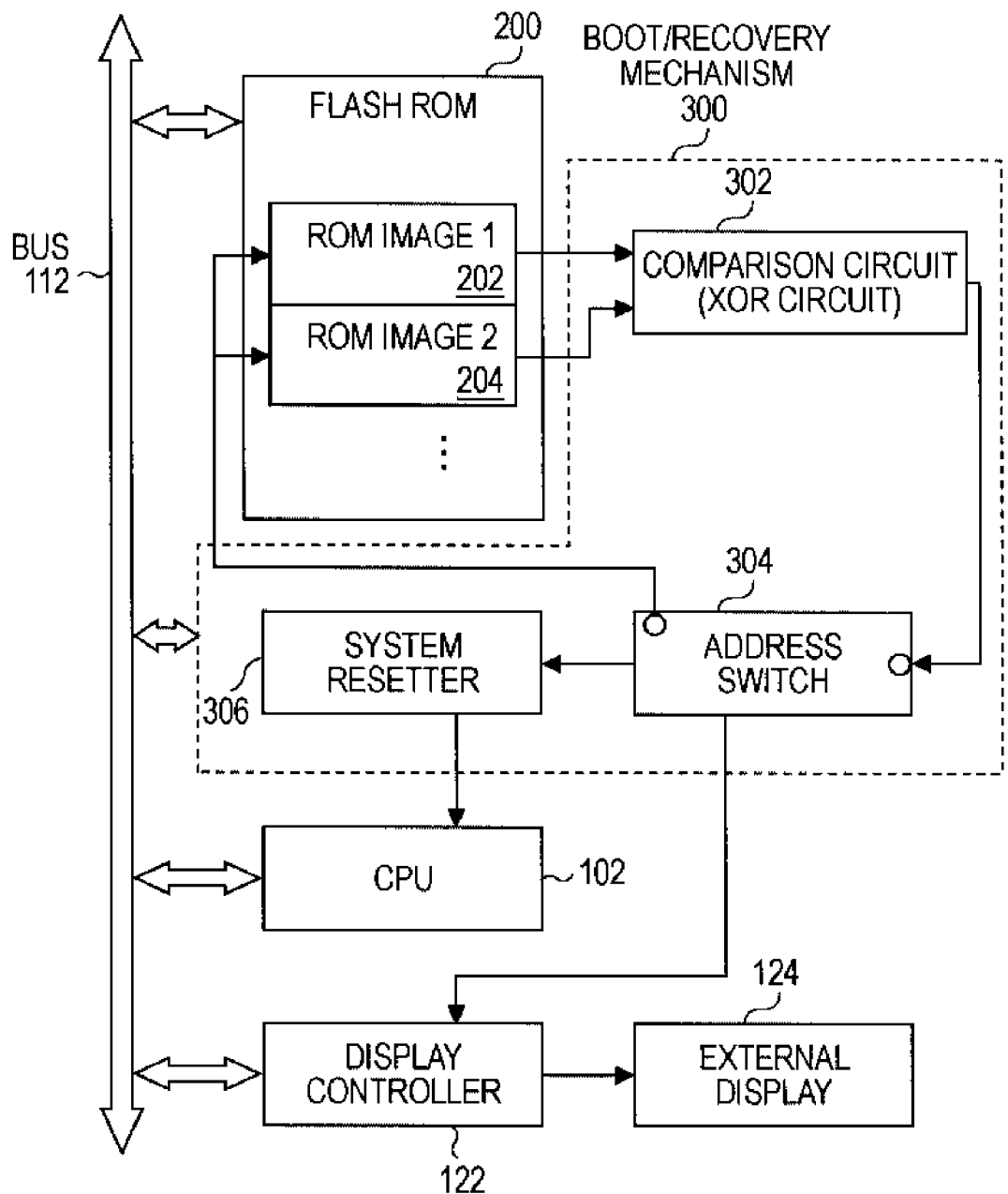
FIG. 3 is a diagram showing a data processing system including a boot/recovery mechanism according to a first embodiment of this invention.
Figure 4:
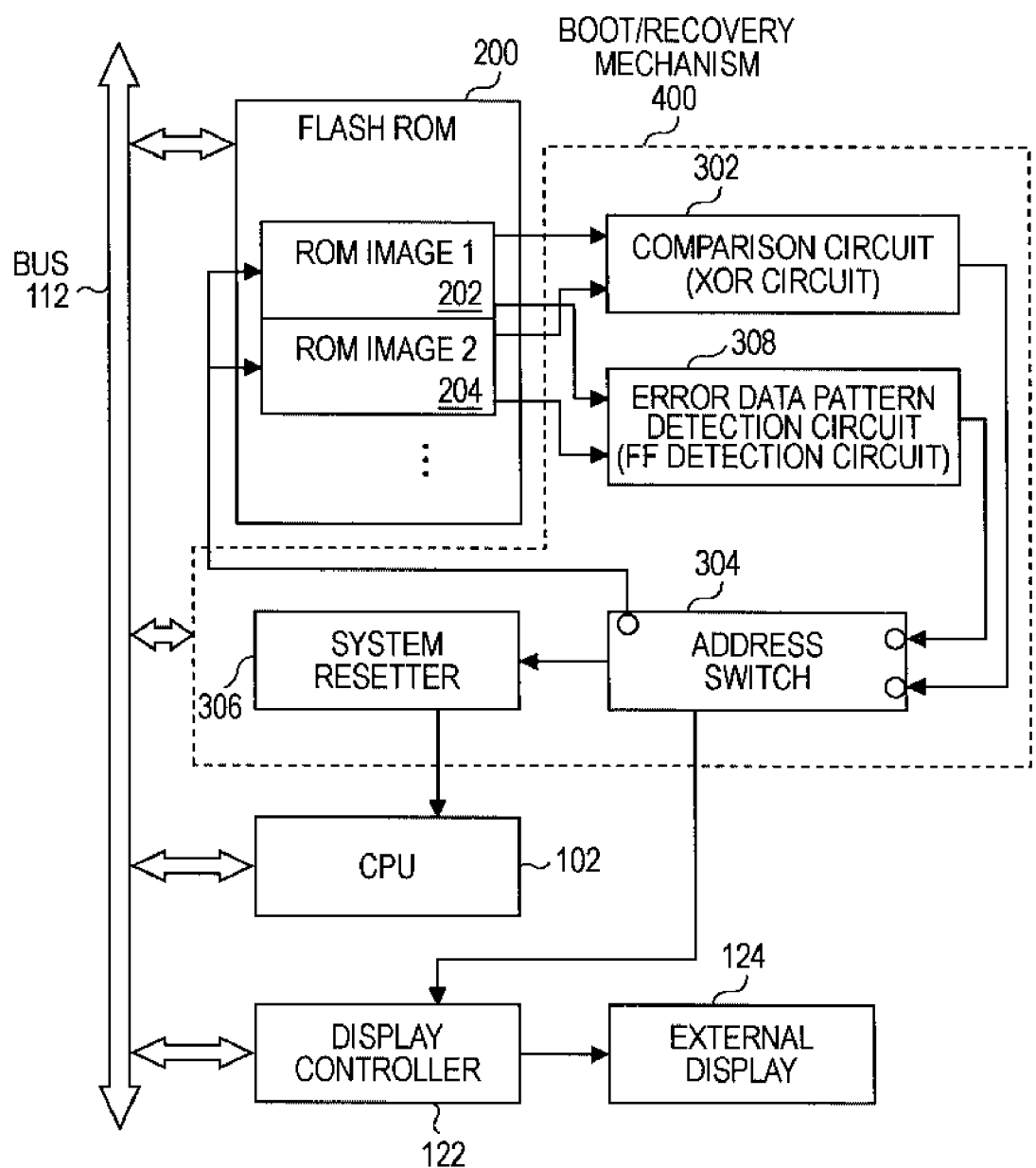
FIG. 4 is a diagram showing a data processing system including a boot/recovery mechanism having an error data pattern detection circuit according to a second embodiment of this invention.

As shown in FIG. 3, the basic configuration of the boot/recovery mechanism 300 according to this invention includes a comparison circuit 302 for comparing multiple ROM images outputted from the flash ROM 200, an address switch 304 for switching between the addresses of ROM images, and a system resetter 306. While an exclusive OR (XOR) circuit will be used as comparison circuit 302 in the description below, the comparison circuit 302 is not limited to an XOR circuit. As shown in FIG. 4, a boot/recovery mechanism 400 preferably includes an error data pattern detection circuit 308 to detect which of ROM images is damaged. This boot/recovery mechanism can be packaged using an IC chip, e.g., a field programmable gate array (FPGA).

A function of the boot/recovery mechanism 300 is to select another ROM image even if a ROM image selected at a boot of the data processing system is damaged (at this time, the comparison circuit detects that two ROM images, which must have identical contents when they are normal, are different), to reset the system, more specifically, the CPU using a system resetter, and to reboot the system using a newly selected ROM image. Another function of the boot/recovery mechanism 300 is to execute a boot/recovery program stored in an undamaged ROM image by CPU to replace data on the damaged ROM image with that on the undamaged ROM image, that is, to replicate (also referred to as "copy") the image content.

FIG. 3 shows an example of the configuration of a data processing system according to a first embodiment of this invention. As shown in FIG. 3, the data processing system includes the rewritable flash ROM 200 that includes multiple ROM images (ROM image 1 202 and ROM image 2 204) that include identical data contents when they are normal. The system according to this embodiment also includes the boot/recovery mechanism 300. The boot/recovery mechanism 300 includes the comparison circuit 302 for comparing ROM images outputted from the flash ROM as storage means, the address switch 304 for switching between ROM images in response to a comparison result from comparison circuit 302, and the system resetter 306 for resetting the CPU (system) in response to the switching between addresses, that is, between ROM images. A program code for outputting the ROM images is preferably stored in the ROM 200. Further, the system is configured so that the CPU 102 executes the BIOS program of any one of multiple ROM images, the ROM images 202 and 204, in the flash ROM 200 via the bus 112.

As shown in FIG. 4, the boot/recovery mechanism 400 in a data processing system according to a second embodiment of this invention includes the error data pattern detection circuit 308 for detecting which of the ROM images 202 and 204 is damaged, in addition to the configuration shown in FIG. 3. The error data pattern detection circuit 308 detects whether or not there is an error data pattern (e.g., FF data) in ROM images outputted from the flash ROM 200. While a case in which multiple ROM images that have identical contents when they are normal are included in a ROM device, e.g., a flash ROM has been described above, multiple ROM devices, each of which includes ROM images having identical contents, may be used instead.

The comparison circuit 302 includes, for example, a difference circuit for obtaining differences between data signals from data buses coupled to a ROM, including multiple signal lines, and an OR circuit for obtaining an OR result of the obtained difference signals. If two ROM images have identical data, all difference signals each have an identical value 0 and the OR circuit outputs a value 0. If the two ROM images have different data, any one of difference signals has a value 1 and the OR circuit outputs a value 1. In other words, checking the output of the OR circuit allows the two ROM images to be compared. As the comparison circuit 302, an XOR circuit, whose circuit configuration is relatively simple, may be used. In this case, a general XOR circuit may be used.

An example of the address switch 304 is a circuit for outputting a chip select (CS) signal for selecting an address line A having a value 1 or a value 0, which is a circuit serving to invert a value outputted from an output pin. For example, if the circuit receives a signal (value 1) from the comparison circuit while a value 0 is outputted as the address line A (refers to start address of ROM image 1) from the output pin, the circuit changes the value of the address A to be outputted from the output pin, to a value 1. Switching between the ROM images 1 and 2 is controlled by a CS signal for selecting the address line corresponding to these ROM images. As for operations, if the ROM image 1 is initially selected, the value of the address A is 0 and the CS signal indicates the ROM image 1. However, if the address switch 304 receives a value 1 from the comparison circuit because the ROM images have different contents, the address switch 304 makes the address line a value 1 to switch to the ROM image 2 so that the output of the CS signal indicates the ROM image 2. For example, the address switch 304 is realized by a flip-flop circuit for inverting an output value each time a signal from the comparison circuit is inputted.

System resetter 306 generates a reset signal to reset the CPU 102 of the system 100 upon receiving a signal indicating operation (or performance) of switching between ROM images from the address switch 304.

Further, it is also possible to display the state of a system error or the like on the external display 124 or the like via the display controller 122 in response to a signal from the address switch 304.

Figure 5:
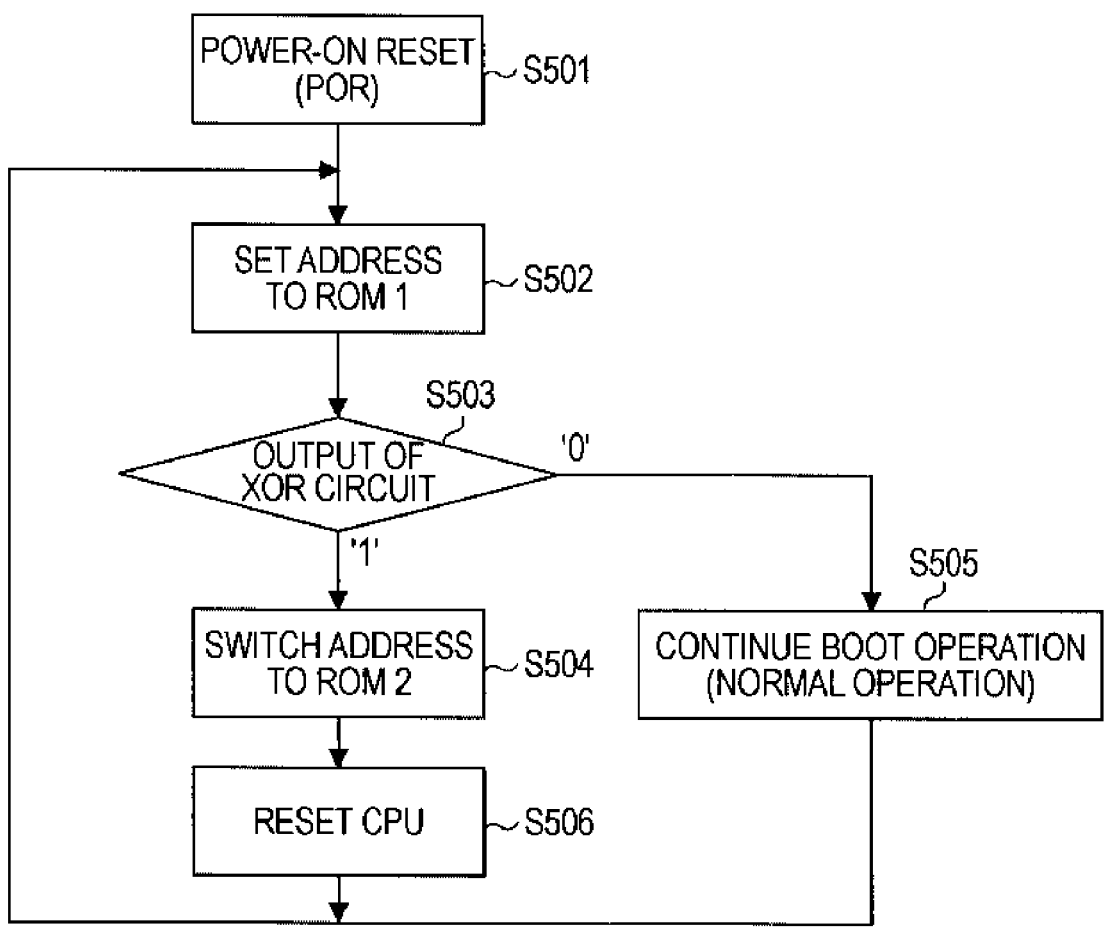
FIG. 5 is a flowchart showing operations of the first embodiment having the configuration shown in FIG. 3.

FIG. 5 shows a flowchart indicating the operations of the data processing system according to the first embodiment shown in FIG. 3. In these operations, the damaged ROM image 1 is switched to the normal ROM image 2. In the following description and the corresponding drawings, ROM images such as the ROM images 1 and 2 will be abbreviated as ROM 1, ROM 2, or the like. It is assumed that if the system boots up normally, the ROM 2 204 includes a BIOS program identical to that in the ROM 1 202, in other words, an identical data block.

When power is turned on or the CPU is initially reset, that is, when power-on reset (POR) is performed (S501), the address is set to that of the ROM 1 by the address switch to select the ROM 1 (S502). Thus data in the ROM 1 is outputted to the CPU. Then data outputs of the ROMs 1 and 2 are inputted to an XOR circuit serving as a comparison circuit. An XOR computation is performed to compare the data outputs, and which operation should be taken next is determined on the basis of a result of the computation (S503). If data is normally outputted from the ROM 1 to the CPU, the same data as that in the ROM 1 is outputted from the same address of the ROM 2 to the XOR circuit. Thus the output based on a result of the computation in the XOR circuit 302 becomes "0" (value 0), and the boot operation continues normally (S505). If data in the ROM 1 is damaged in step S503, data in the ROM 1 and data in the ROM 2 are not matched, that is, these pieces of data have different contents. Thus the output of the XOR circuit becomes "1" (value 1) and a boot error is detected. If an error is detected, the address switch 304 switches to the address of the ROM 2 in order to output data in the ROM 2 to the CPU, that is, in order to switch to a BIOS program in the ROM 2 (S504). Subsequently, the CPU 102 is reset using system resetter 306 in response to the address switch and then rebooted using the BIOS program in the ROM 2 (S506). In the first embodiment, the image data in the ROM 1 is replaced with that in the ROM 2 assuming that the ROM 1 has a problem. In other words, it is not detected which of the ROM images is damaged. Note that if the image data in the ROM 2 is initially outputted to the CPU, operations will be performed with the ROM 1 and the ROM 2 interchanged with each other.

In the configuration shown in FIG. 3, it is assumed that the ROM image having a problem (or failure) or the damaged ROM image is a ROM image that has initially outputted image data. Therefore it cannot be determined which of the ROM images has a problem. For this reason, an data processing system according to a second embodiment in which the boot/recovery mechanism further includes a component for detecting which of the ROM images 202 and 204 is damaged is shown in FIG. 4. In FIG. 4, the boot/recoverymechanism 400 further includes the error data pattern detection circuit (also referred to as an "FF detection circuit" for short) 308 for detecting which of the ROM images has a problem if the comparison circuit detects an error. Specifically the data processing system according to the second embodiment includes the flash ROM 200 including multiple ROM images, ROM images 202 and 204 (ROM 1 and ROM 2), which have identical contents, the comparison circuit 302 (realized by an XOR circuit) that is coupled to the flash ROM and compares the contents of the ROM images, the address switch 304 for switching among multiple ROM images (two in this case) in response to a result of the comparison (computation) from the comparison circuit 302, the error data pattern detection circuit 308 for detecting which of the ROM images is damaged, and the system resetter 306. The data processing system further includes the CPU 102, which is coupled to the address switch 304 via the system resetter 306.

Figure 6:
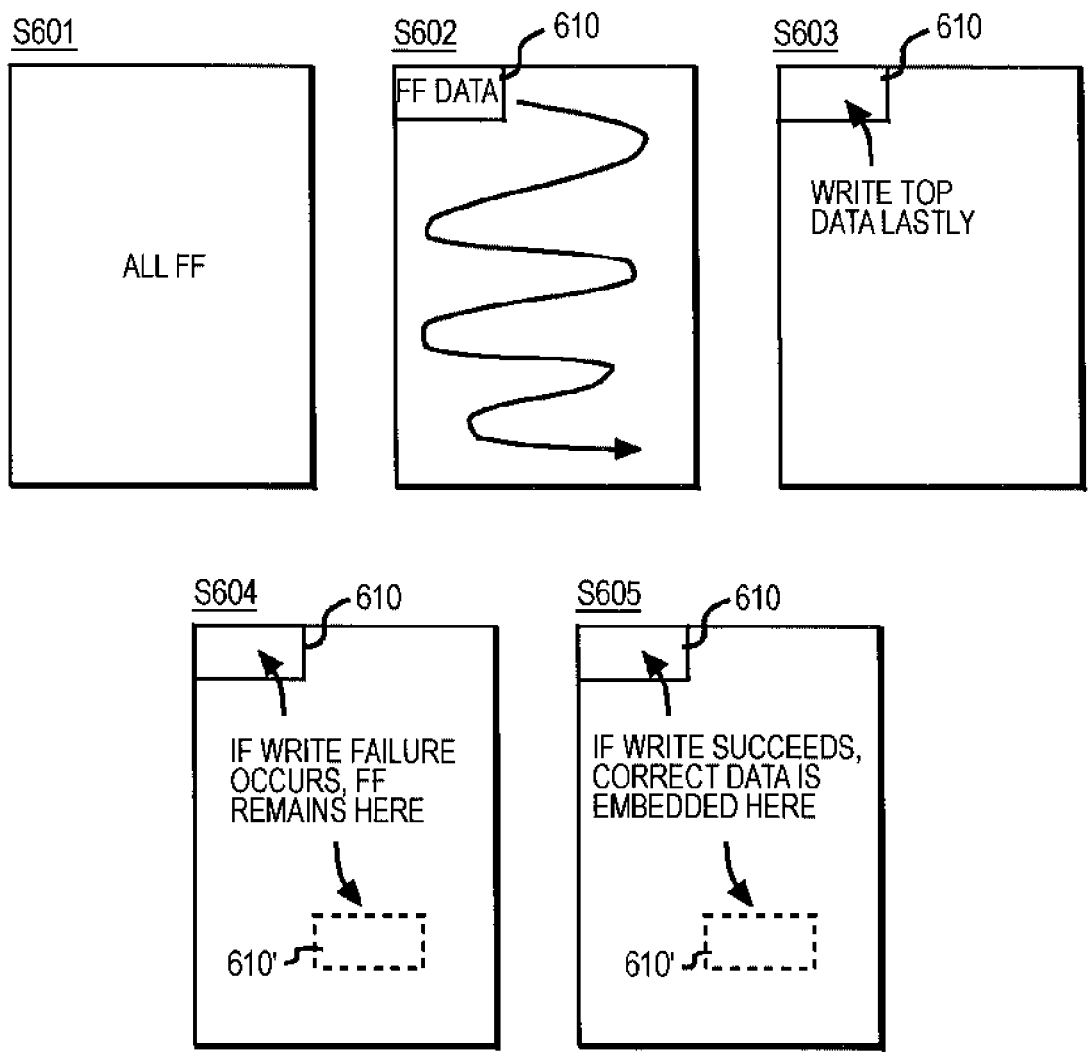
FIG. 6 is a diagram showing the relation between a method for writing data to a flash ROM and an error data pattern (FF).

A method for writing data (including a program code; the same goes for the description below) to the flash ROM will now be described. The operations of the error data pattern detection circuit (FF detection circuit) 308 are carried out using this method. FIG. 6 shows a method for writing data to the ROM in the configuration shown in FIG. 4. Steps shown below are taken in principle.

1) Erase the region of the current ROM image (S601). Data in the flash ROM will be erased on a block-by-block basis according to an erase command. At this time all the erased blocks will become "1", that is, FF.

2) Write parts of a new ROM image except for a top part (610) of the initialization code to the ROM (S602).

3) Write normal data to the top part 610 of the initialization code of the new ROM image (S603).

A feature of this write method is that if a data writing to the ROM has succeeded, all data is written without a problem (S605). However, if a problem has occurred in writing data due to a problem or for other reasons, normal data is yet to be written to the top part 610 of the ROM image and FF data remains there (S604). If FF data is left in the region of the ROM 1 and is not left in the region of the ROM 2, it is understood that normal data is written to the ROM 2. While an example in which data is written to parts of the initialization code except for the top part 610 thereof has been described in FIG. 6, an identical arbitrary address positions 610' seen from the respective start addresses of the ROM 1 and the ROM 2 may be used instead of the top parts 610. Specifically, checking if FF data is left at the tops 610 or the arbitrary positions 610' to check which of the ROMs has a problem after an error has been detected by the XOR circuit in the configuration shown in FIG. 4 allows a ROM image having a problem to be identified.

As with the comparison circuit 302, the error data pattern circuit 308 includes a difference circuit for obtaining differences between data signals from data buses coupled to ROM, including multiple signal lines, and an OR circuit for obtaining an OR result of the obtained difference signals. If a difference between data in a normal ROM image and a data signal from a ROM image including an error data pattern (e.g., O×FF) is obtained and then a value 1 is outputted by the OR circuit that has received the obtained difference signal outputs, it is demonstrated that the pieces of data in the ROM images have different contents. This allows an error data pattern to be detected.

Figure 7:
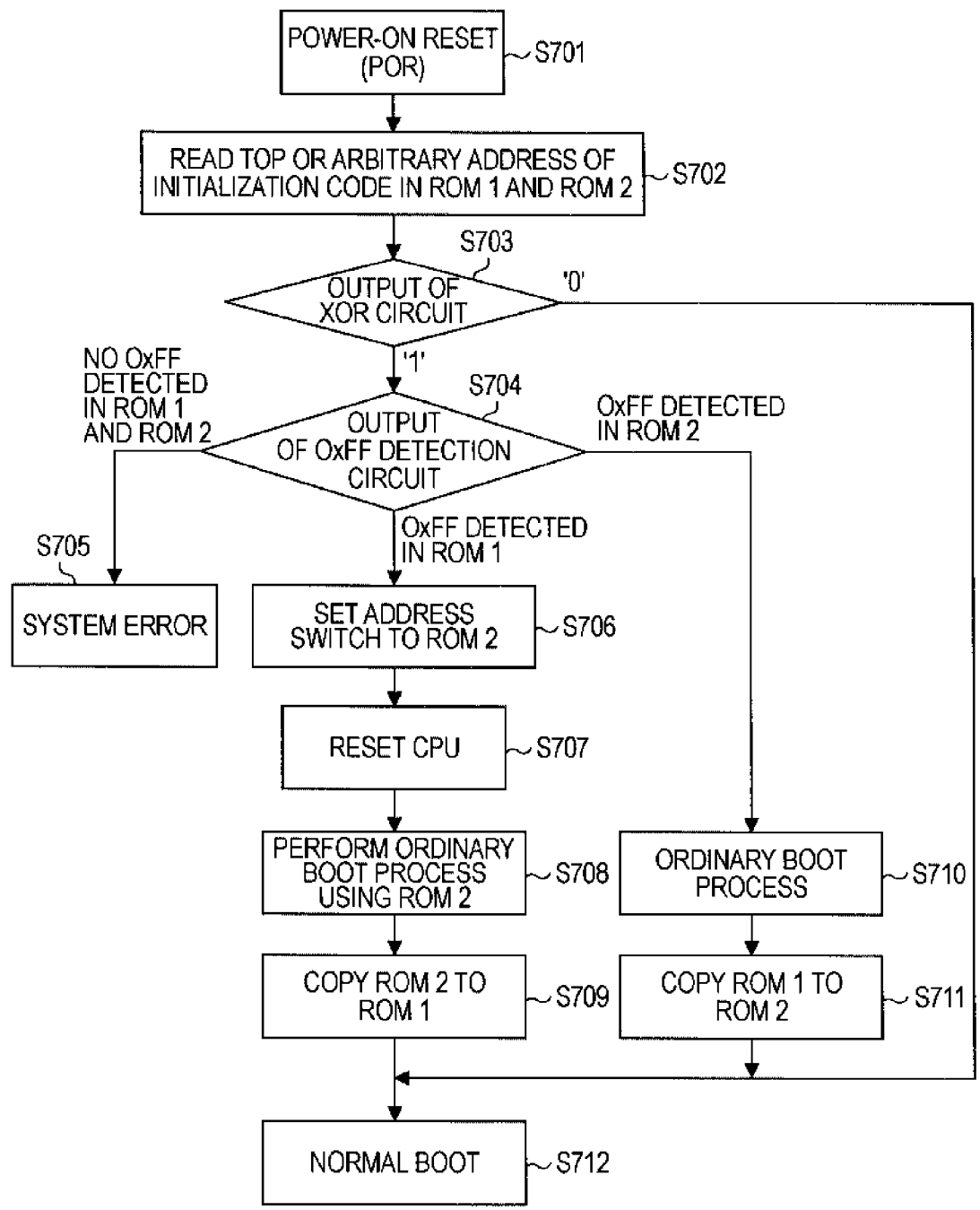
FIG. 7 is a flowchart showing operations of the second embodiment having the configuration shown in FIG. 4.

FIG. 7 shows a flowchart of the operations of the data processing system according to the second embodiment shown in FIG. 4. For the sake of simplicity, assume that data (including a program code) in the ROM 1 is initially outputted to the CPU to boot the BIOS program in the ROM 1. When power is turned on or the CPU is initially reset, that is, when POR is performed (S701), the tops of the initialization codes (or identical addresses of arbitrary positions) and images are written in the ROM 1 and the ROM 2 (S702). Subsequently the image outputs of the ROM 1 and the ROM 2 are inputted to the XOR circuit 302, and which operation should be taken next is determined based on a result of a computation (S703). If the image outputs from the identical addresses of the ROMs 1 and 2 are identical, that is, if the XOR circuit outputs "0" (value 0), the system will boot up normally in this manner (S712). If the XOR circuit 302 outputs "1" (value 1), the FF detection circuit 308 detects which of the ROMs still contains FF data (O×FF) after a write to the ROM has failed (S704). If O×FF is detected in the ROM 1, in other words, if the ROM 1 is damaged, the address switch 304 switches to the ROM 2 (S706), then the system resetter 306 resets the CPU (S707), and an ordinary boot process is performed using the ROM 2 (S708). Subsequently the ROM 2, whose data is normal, is copied to the ROM 1, whose data is damaged, that is, the image of the ROM 1 is replaced with the image of the ROM 2 (S709). If the FF detection circuit 308 detects O×FF not in the ROM 1 but in the ROM 2, the ordinary boot process is continued (S710) in that manner. Subsequently the normal ROM 1 is copied to the ROM 2 in which the image such as data is damaged (S711). If O×FF is detected in none of the ROMs 1 and 2, a system error is outputted to the external display 124 or the like via display controller 122 (S705).

Note that if data in the ROM 2 is initially outputted to the CPU, the above-mentioned steps are taken with the ROMs 1 and 2 interchanged with each other.

Note that in the description below and the corresponding flowcharts, booting the system using a BIOS program in a ROM image may be referred to as "booting (performing a boot process) using ROMx (x is an integer)," and replicating a ROM image to another ROM image referred to as "copying the ROM 2 to the ROM 1", for example.

If a ROM image is damaged by a problem other than a write operation to the ROM image during operation of the data processing system, it is also possible to detect such a problem and to switch the damaged ROM image to a normal ROM without resetting the system.

Figure 8:
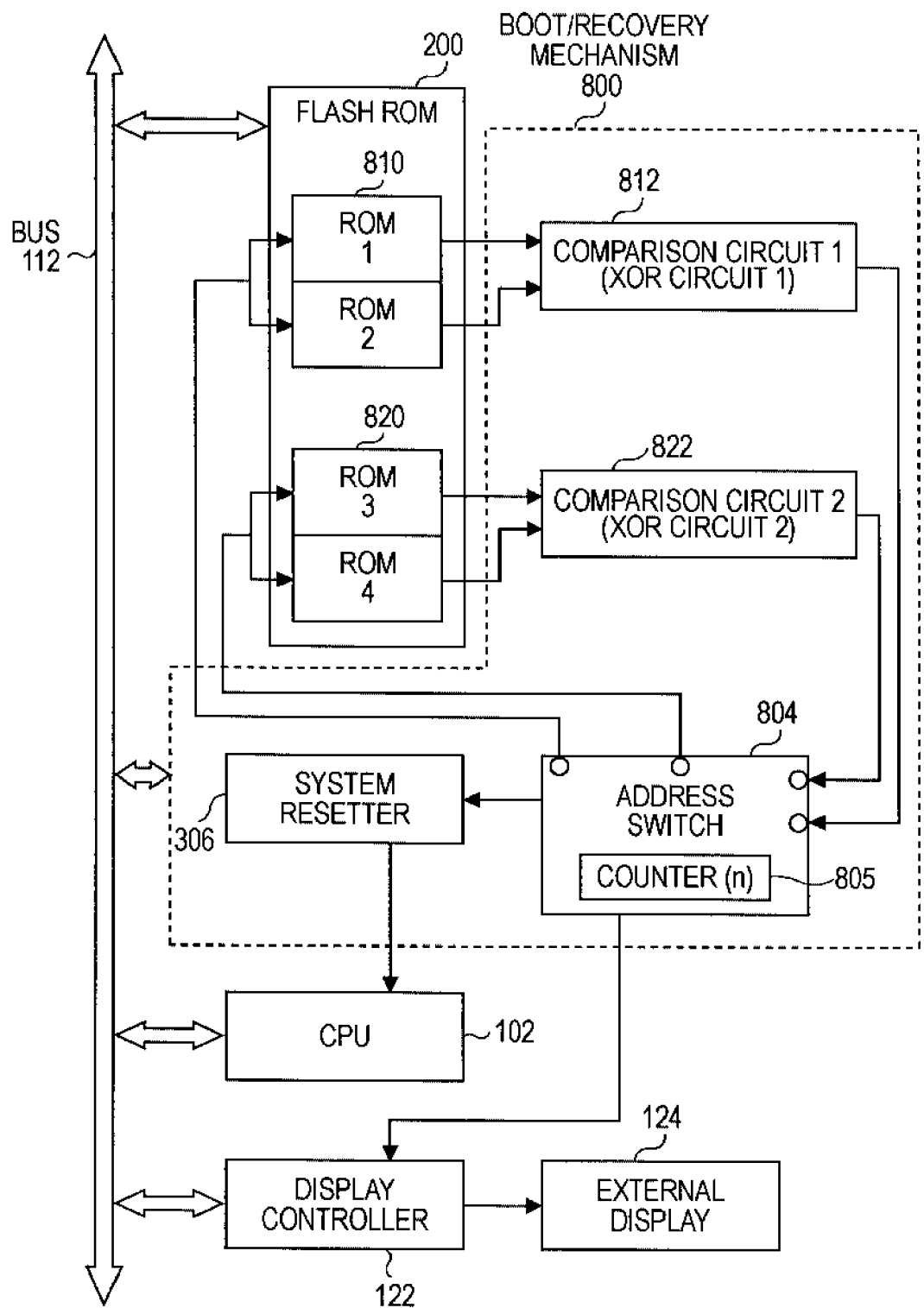
FIG. 8 is a diagram showing an data processing system including two ROM image pairs according to a third embodiment of this invention.

FIG. 8 shows a data processing system according to a third embodiment of this invention. The third embodiment is an extension of the basic configuration shown in FIG. 3 and includes a boot/recovery mechanism 800 that allows normal boot of the data processing system as well as recovery of a damaged ROM image, without using the error data pattern detection circuit (FF detection circuit) 308. In the description below and the corresponding drawing, ROM image x (x is an integer) is abbreviated as ROMx. Each ROM image includes a BIOS program as shown in FIG. 2. The flash ROM 200 shown in FIG. 8 includes multiple ROM images, four ROM images here, and two ROM images forms an image pair. In the description below, the number x of an image pair is represented by image pair (x) (x is an integer). As shown in FIG. 8, the flash ROM 200 includes (1) a ROM image pair (1) 810 that has a pair of the ROMs 1 and 2, two ROM images that have identical capacities and identical data contents (in other words, the ROM 2 is a replica of the ROM 1) and (2) a ROM image pair (2) 820 that has a pair of a ROM 3 and a ROM 4, two ROM images that have identical capacities and identical data contents (in other words, ROM 4 is a replica of ROM 3).

In addition to the flash ROM 200 described above, the data processing system shown in FIG. 8 includes a comparison circuit 1 (XOR circuit 1) 812 and a comparison circuit 2 (XOR circuit 2) 822 that couple the respective image outputs of ROM images (ROM 1 and ROM 2, ROM 3 and ROM4) forming the ROM image pairs 810 and 820, respectively, for example, using an XOR to compare these image outputs, the address switch 804 for switching between two ROM image pairs, and the system resetter 306 coupled to the address switch 804 for resetting the CPU 102. The ROM 3 may be an identical ROM image to the ROM 1 or a ROM image different from the ROM 1. In other words, a BIOS program stored in the ROM 3 may be an identical BIOS program to that stored in the ROM 1 or a BIOS program different from that stored in the ROM 1.

While an example in which XOR circuits are used as comparison circuits is described here, other types of comparison circuits can be used. Incidentally the address switch 804 includes a counter (n) 805 for counting the number n corresponding to the currently selected ROM image pair so as to select a ROM image pair and thus boot a BIOS program in each ROM image. The n-th ROM image pair is made up of two ROM images, ROM 2n−1 and ROM 2n (n is an integer).

If one of two ROM images (having identical contents when they are normal) forming a ROM image pair initially booted up is damaged, the corresponding XOR circuit outputs "1" (value 1). This makes it possible to detect that the ROM image pair currently being booted is damaged. If it is detected that the ROM image pair currently being used for a boot is damaged, the following series of operations can be performed: a signal (value 1) is sent to the address switch 804, the address switch 804 switches to the address of another ROM image pair, and a boot is attempt using a BIOS program in one of ROM images forming the ROM image pair to which the address switch 804 has switched.

Figure 10:
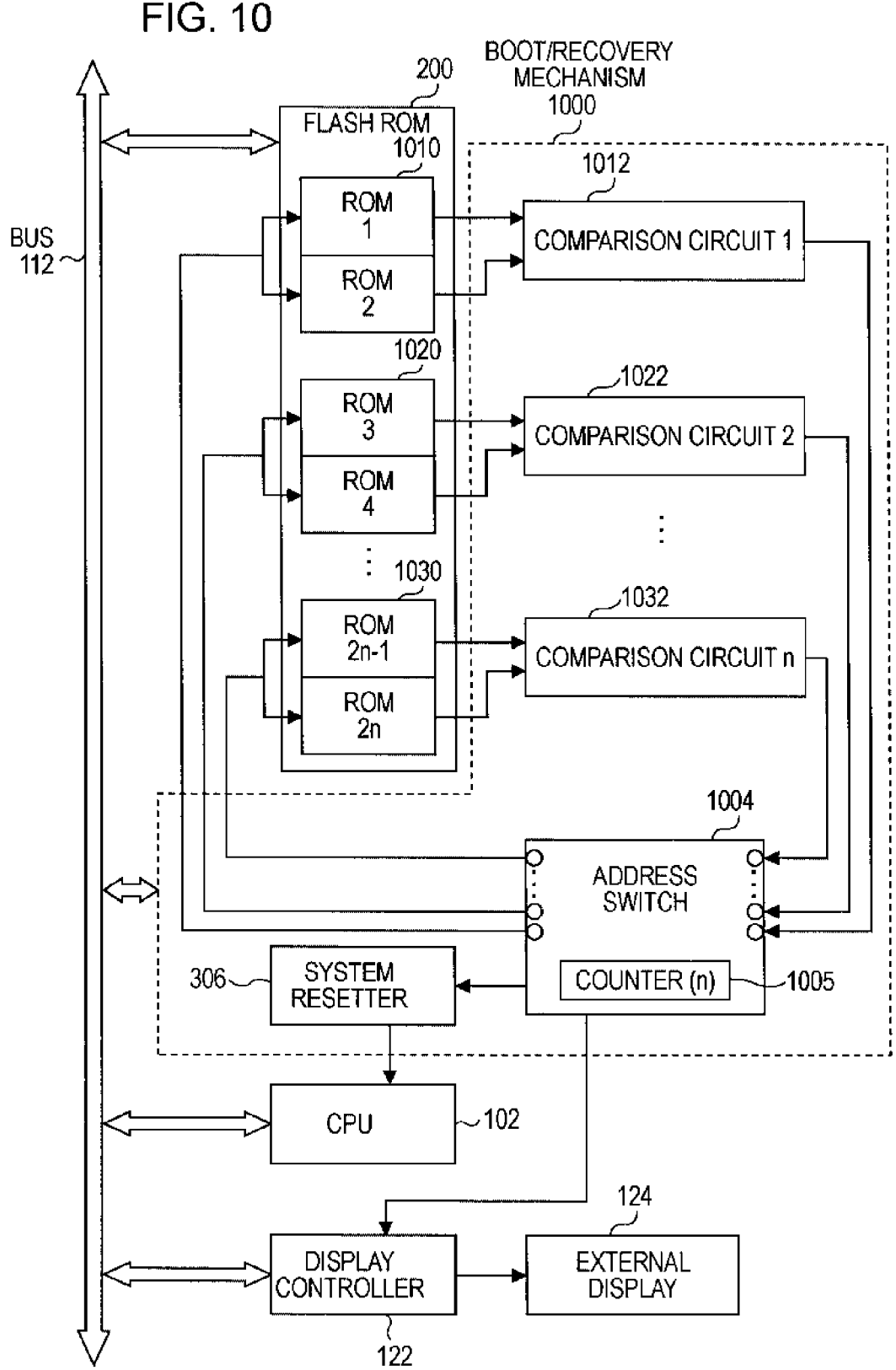
FIG. 10 is a diagram showing a data processing system including N units of ROM image pairs according to this invention.

Further, in order to enhance reliability of an data processing system while preventing occurrence of a boot error as much as possible, it is possible to extend the configuration shown in FIG. 8 to a configuration having 2N (N is an integer equal to or more than 2) units, which means an even number, of ROM images, as shown in FIG. 10. ROM 2n−1 and ROM 2n (herein, ROM 1, ROM 2, ROM 3, ROM 4 . . . ) in n units of ROM image pairs, ROM image pairs 1010, 1020, 1030 . . . , have an identical ROM image. In other words, one of two ROM images included in a ROM image pair is a replicate of the other ROM image and these ROM images have an identical BIOS program. ROM images included in another ROM image pair may have different images, that is, different BIOS programs. It is possible to couple comparison circuits 1012, 1022 . . . 1032 (realized by XOR circuits; total number is n) to the corresponding ROM image pairs, respectively. The system is booted up by stopping booting up using a ROM image pair (BIOS program therein) including a damaged ROM image, selecting a normal ROM image pair, and using a BIOS program included in one of ROM images forming the selected normal ROM image pair. Further it is also possible to replace the ROM images forming the ROM image pair having the damaged ROM image with normal ROM images so as to recover the damaged ROM image in preparation for the subsequent boot. It is conceivable that the case of N=1 corresponds to FIG. 3, which is the basic configuration. When N=1, that is, when the number of ROM images is two, it is not possible to determine which of ROMs is damaged, as described above. On the other hand, the configuration shown in FIG. 8 or 10 is different from that shown in FIG. 3 in that it allows determination which of ROM image pairs has a problem.

Figure 9:
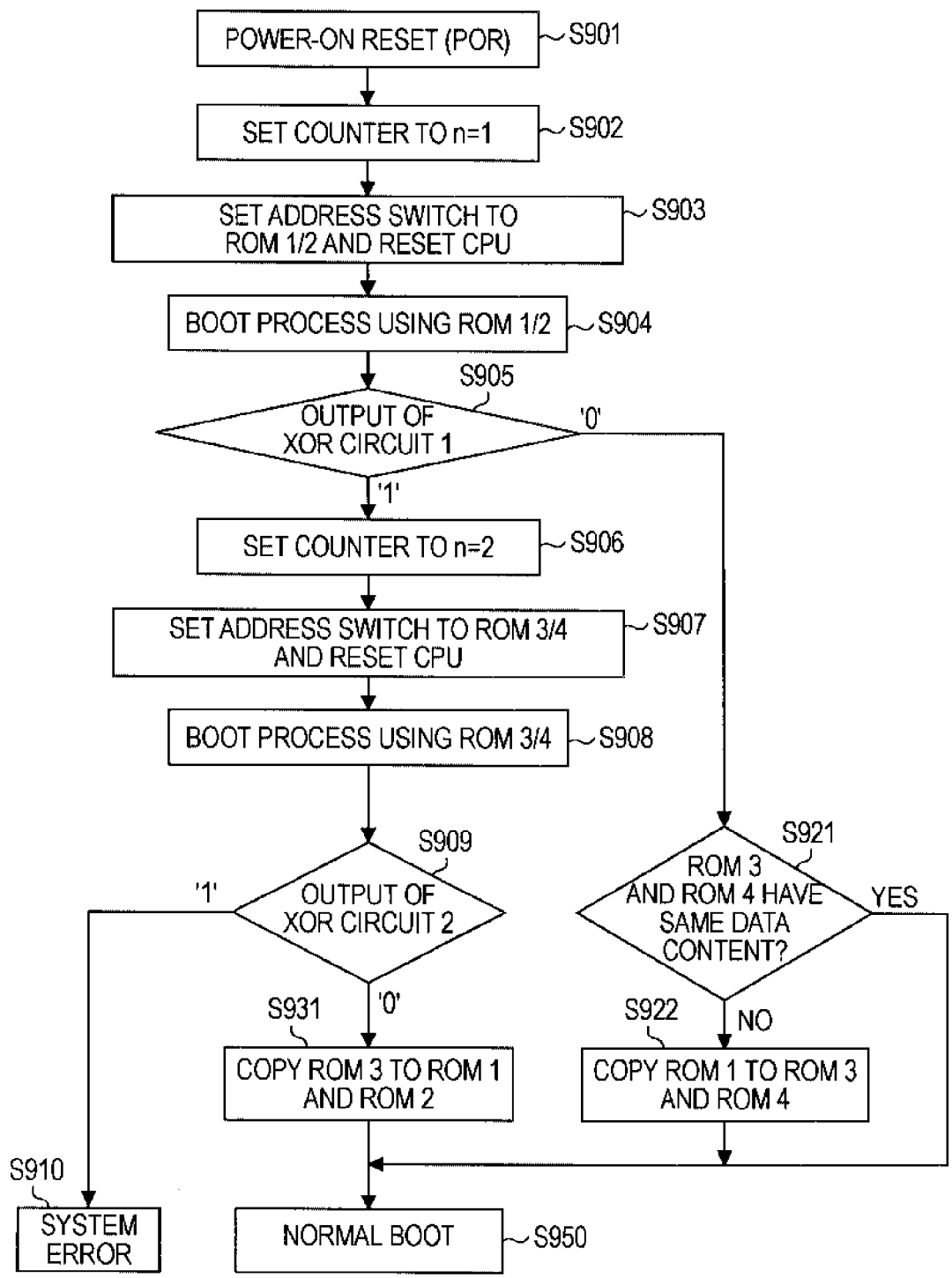
FIG. 9 is a flowchart showing operations of the third embodiment having the configuration shown in FIG. 8.

Operations of the data processing system having four ROM images that has the basic configuration according to the third embodiment will be described with reference to FIG. 8 and the flowchart shown in FIG. 9. As shown in FIG. 8, four ROM images form two ROM image pairs. In the description below, the number x of an image pair is represented as "image pair (x)" (x is an integer). Specifically a case in which a system configuration including the image pair (1) 810 made up of ROM 1/ROM 2 and the image pair (2) 820 made up of ROM 3/ROM 4 is used will be described with accordance with the flowchart shown in FIG. 9. In FIG. 9, "ROM 1/2" means the image pair formed by the ROM image 1 (ROM 1) and ROM image 2 (ROM 2). "BOOT PROCESS USING ROM 1/2" means performing a boot process using a BIOS program in one of the ROM images forming the image pair (ROM image 1 and ROM image 2). The same goes for "ROM 3/4."

In FIG. 9, power-on reset is initially performed (S901). In order to count the number n of an image pair including a ROM image with which the system is booted, the counter is initially set to n=1 (S902). At this time, an image pair formed by ROM image 2n−1 and ROM image 2n, that is, the ROMs 1 and 2 is selected. Then the address switch 804 is set to image pair (1) 810 formed by ROM 1/2, the CPU 102 is reset (S903), and a boot process is performed using a BIOS program in one of the ROM images forming the image pair (1) 810 (S904), for example, the ROM 1. Further, image outputs of ROM 1/ROM 2 go through a computation process in the XOR circuit 1 812 (S905). If the output is '0', it can be confirmed that the ROMs 1 and 2 have identical contents and are normal, and the image contents of the ROMs 3 and 4 are compared (S921). If the image contents are different, the image of the ROM 1 is copied to the images of the ROMs 3 and 4 (S922). If the ROMs 3 and 4 have identical contents, there is no problem. Therefore, the system continues to boot up in that manner, for example, using a BIOS program in the ROM 1 (S950). In step 921, the XOR circuit 2 822 is used to compare the image contents of the ROMs 3 and 4. Alternatively it is possible to cause the CPU to execute a program code that is stored in a boot/recovery block of the ROM 1 booted normally and is designed to compare ROM images.

If the output of XOR circuit 1 812 is '1' in step S905, counter (n) 805 is set to n=2 by increasing the count by 1 (S906), the address switch 804 is set to the image pair (2) 820 formed by the ROMs 3 and 4, which is the second image pair formed by ROM images having the numbers 2n−1 and 2n, and the CPU is reset (S907), and a boot process is performed using a BIOS program in one of the ROM images forming image pair (2) 820, for example, ROM 3 (S908). Further the image outputs of the ROMs 3 and 4 are inputted to the XOR circuit 2 822 and subjected to a computation process (S909). If the computation process results in '0', the image pair (2) 820 is normal. The image of the ROM image 3 (ROM 3) is copied to the ROM images 1 and 2 (ROM 1/ROM 2) forming the ROM image pair (1) 810, which may be damaged (S931). Further a boot process is performed, for example, using a BIOS program in ROM 3 (S950). If the computation process results in '1' in step 909, it is considered that none of the two ROM image pairs has correct data. Thus a system error is displayed on the external display 124 via the display controller 122 (S910).

Figure 11:
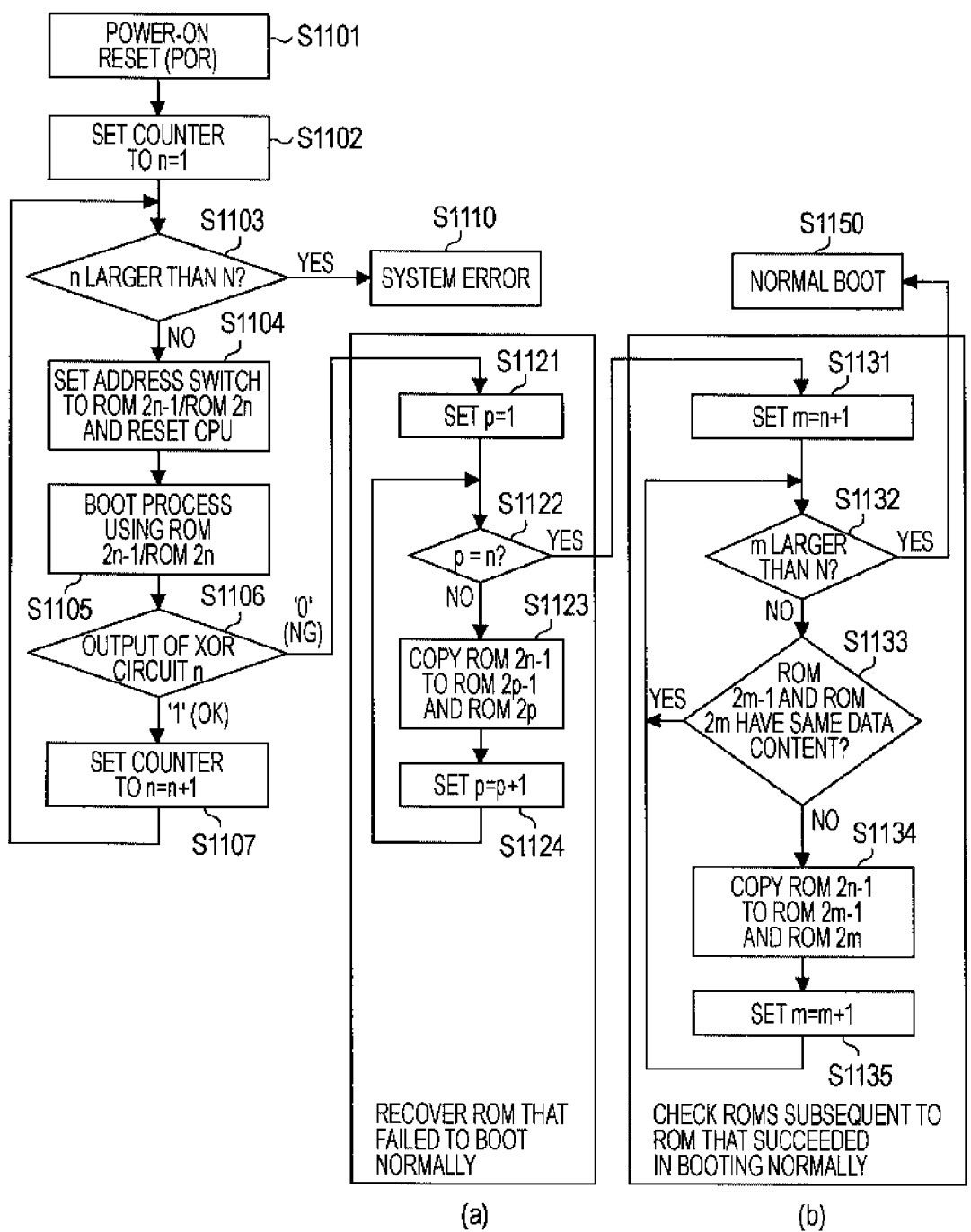
FIG. 11 is a flowchart showing operations of an embodiment having the configuration shown in FIG. 10.

The configuration shown in FIG. 10 and the operations shown in the flowchart of FIG. 11 are the generalizations of the configuration shown in FIG. 8 and the operations shown in the flowchart of FIG. 9. Further FIG. 11 shows the operations to boot up the system and those to recover a damaged ROM image using the generalized FIG. 10 configuration. As shown in FIG. 11, power-on reset is performed (S1101) and then a counter 1005 is initially set to n=1 (S1102). Subsequently the following operations are repeated in principle: with respect to the ROM image pairs count (N) depending on the system configuration and the number (n) of a ROM image pair including a ROM image that is about to boot up the system are compared using the counter 1005 (SI 103); an address switch 1004 is sequentially set to n-th ROM image pair (corresponding ROM images are ROM 2n−1, ROM 2n) and the CPU 102 is reset (S 104); a boot process is performed using a BIOS program in one (usually, ROM 2n−1) of ROM 2n−1 and ROM 2n forming the ROM image pair (S1105); data in each of ROM 2n−1 and ROM 2n, which are ROM images forming each image pair, goes through a computation process in the corresponding comparison circuit n (e.g., XOR circuit) 1012, 1022, . . . 1032 to determine whether or not pieces of data in the ROM image pair are damaged (S106); if there is a piece of damaged data (XOR circuit outputs '1'), the counter is increased by 1 to proceed to a boot process using the subsequent ROM image pair (S1107). In this way, steps 1103 to 1106 are repeated. If there is no damaged data in a ROM image pair (XOR circuit outputs '0'), the flowchart proceeds to processes for recovering a ROM image in a ROM image pair that has a number smaller or larger than that of the ROM image pair and that has failed to boot up the system normally ((a) and (b) flows in FIG. 11).

If any ROM image pair has succeeded in booting up the system normally and if the number p of a ROM image pair that has failed to boot up the system normally is smaller than the number n of the ROM image pair that has succeeded in booting up the system normally, a process for replacing (copying) the failed ROM image pair p (including ROM 2p−1 and ROM 2p; p is an integer) with ROM 2n−1 in the successful ROM image pair is performed with accordance with the steps shown in (a) of FIG. 11 in preparation for the subsequent boot (S1121 to S1124). For example, a case in which, if image pair (1) 810 formed by ROM 1/ROM 2 shown in FIG. 8 is damaged, the image of the ROM 3 included in the image pair (2) 820 formed by ROM 3/ROM 4, which has succeeded in booting up the system, is copied to the ROMs 1 and 2 corresponds to the steps 1121 to S1124 (n=2, p=1).

If a ROM image pair has succeeded in booting up the system normally but there are ROM image pairs with which no attempt to boot the system has been made, subsequent to the successful ROM image pair, the steps (S1131 to S1135) shown in FIG. 11(b) are processed. The ROM images (ROM 2m−1 and ROM 2m) forming a ROM image pair having the number m (m is an integer equal to or more than 2) with which no attempt to boot the system has been made are compared to each other to know whether or not the ROM images have identical image contents (S1133). If the ROM images have different image contents, ROM 2n−1 included in ROM image pair n that has succeeded in booting up the system is copied (replaced) to ROM 2m−1 and ROM 2m (S1134). For example, if the image pair (1) 810 formed by ROM 1/ROM 2 shown in FIG. 8 has succeeded in booting up the system normally, the contents of ROM images in the subsequent image pair (2) 820 formed by the ROMs 3 and 4 are also checked. If the contents are different, the data content of the ROM 1 that has succeeded in booting up the system normally is copied to the ROMs 3 and 4. This case corresponds to the steps 1131 to 1135 (n=1, m=2) in (*b*) of FIG. 11.

The count of p and m, comparison between ROM 2*m*−1 and ROM 2*m*, or the like can be included in a program code of a boot/recovery block (see FIG. 2) stored in a ROM image.

While it is conceivable that a data processing system according to this invention is a computer system, such as a personal computer as shown in FIG. 1, in the embodiments described above, the invention is not limited to a computer system. This invention is applicable to data processing systems in general, such as PC servers and workstations. Windows XP (R), AIX (R), Linux (R), or the like is preferable as an operating system; however, this invention is not limited to a particular operating system environment.

While it is also possible to store the current status of the address switch in the flash ROM so as to retain the current status even at power-off in the above-mentioned embodiments, the current status may be stored in a memory such as a non-volatile RAM (NVRAM).

While the above-mentioned embodiments are configured so that groups made up of two ROM images, each of which has a BIOS program, are formed among multiple ROM images in a ROM and switching between those groups are performed, it is also possible to form groups made up of three or more ROM images (each of which has a BIOS program) and to perform switching between these groups sequentially using an address switch.

While a flash ROM is used as a memory for storing a BIOS program in the above-mentioned embodiments, a BIOS program may be stored in an electronically erasable and programmable read-only memory (EEPROM) or the like.

While the embodiments of this invention have heretofore been described, this invention is not limited to these embodiments. Alternatively, various improvements, modifications, or alterations can be made to these embodiments on the basis of the knowledge of those skilled in the art without departing from the spirit and scope of this invention.

What is claimed is:

1. A data processing system comprising:
   a processor;
   a memory, coupled to said at least one processor, for storing a first read-only memory (ROM) image that stores a first basic input output system (BIOS) program for booting said data processing system and a second ROM image that is a replica of said first ROM image that stores a second BIOS program identical to said first BIOS program; and
   a computer-usable medium embodying instructions executable by said at least one processor and configured for:
      initially selecting said first ROM image to boot said data processing system by utilizing said first BIOS program stored in said first ROM image;
      comparing contents of said first ROM image and said second ROM image outputted from said memory;
      in response to a determination that contents of said first ROM image are different contents from said second ROM image, detecting an error data pattern in said first ROM image and said second ROM image outputted from said memory; and
      in response to a detection of an error data pattern, selecting said second ROM image and booting said data processing system utilizing said second BIOS program stored by said second ROM image.

2. The data processing system according to claim 1, wherein said instructions are further configured for:
   in response to switching between said first ROM image and said second ROM image, resetting said data processing system.

3. The data processing system according to claim 2, wherein said instructions are further configured for:
   in response to detecting an error data pattern in said second ROM image, selecting said first ROM image.

4. A data processing system comprising:
   at least one processor;
   an interconnect coupled to said at least one processor;
   a memory coupled to said at least one processor via said interconnect, wherein said memory stores a first read-only memory (ROM) image pair that includes a first ROM image that stores a first basic input output system (BIOS) program for booting said data processing system and a second ROM image, a replica of said first ROM image, that stores a second BIOS program that is identical to said first BIOS program, and wherein said memory stores a second ROM image pair that includes a third ROM image that stores a third BIOS program that is identical to or different from said first BIOS program and a fourth BIOS program, a replica of said third ROM image, that stores a fourth BIOS program that is identical or different from said first BIOS program;
   a computer-usable medium embodying computer program code, said computer-usable medium being coupled to said interconnect, said computer program code comprising instructions executable by said at least one processor and configured for:
      in response to receiving said first ROM image pair outputted from said memory, comparing said first ROM image and said second ROM image;
      in response to receiving said second ROM image pair, comparing said third ROM image and said fourth ROM image;
      initially selecting said first ROM image pair to boot said data processing system utilizing either said first BIOS program stored in said first ROM image or said second BIOS program stored in said second ROM image;
      in response to determining contents of said first ROM image and said second ROM image are different, selecting said second ROM image pair; and
      booting said data processing system utilizing either said third BIOS program stored in said third ROM image or said fourth BIOS program stored in said fourth ROM image.

5. The data processing system according to claim 4, wherein said instructions are further configured for:
   detecting an error data pattern in said first ROM image and said second ROM image outputted from said memory; and
   inputting a detection result.

6. The data processing system according to claim 4, wherein said instructions are further configured for:
   in response to determining contents of said first ROM image and said second ROM image are identical, booting said data processing system utilizing said first BIOS program stored in said first ROM image included in said first ROM image pair; and
   replacing said third ROM image and said fourth ROM image included in said second ROM image pair with said first ROM image.

7. A computer-implementable method for implementing boot/recovery in a data processing system that includes a first read-only memory (ROM) image storing a first basic input output system (BIOS) program and a second ROM image, a replica of said first ROM image, that stores a second BIOS program that is identical to said first BIOS program, said computer-implementable method comprising:

starting a boot process on said data processing system utilizing said first BIOS program stored by said first ROM image;

comparing contents of said first ROM image and said second ROM image;

in response to determining said contents are different, determining whether there is an error data pattern in said first ROM image;

in response to determining there is an error data pattern in said first ROM image, selecting said second ROM image; and booting said data processing system utilizing said second BIOS program stored by said second ROM image.

8. The computer-implementable method according to claim 7, further comprising:

in response to determining said contents of said first ROM image and said second ROM image are identical, booting said data processing system utilizing said first BIOS program of said first ROM image.

9. The computer-implementable method according to claim 7, further comprising:

in response to determining an error data pattern is detected in said second ROM image, replacing said second ROM image with said first ROM image.

10. A computer-implementable method for implementing boot/recovery in a data processing system that includes stores a first read-only memory (ROM) image pair that includes a first ROM image that stores a first basic input output system (BIOS) program for booting said data processing system and a second ROM image, a replica of said first ROM image, that stores a second BIOS program that is identical to said first BIOS program, and wherein said memory stores a second ROM image pair that includes a third ROM image that stores a third BIOS program that is identical to or different from said first BIOS program and a fourth BIOS program, a replica of said third ROM image, that stores a fourth BIOS program that is identical or different from said first BIOS program, said computer-implementable method comprises:

starting a boot process on said data processing system utilizing said first BIOS program stored by said first ROM image included in said first ROM image pair;

comparing contents of said first ROM image and said second ROM image;

in response to determining said contents of said first ROM image and said second ROM image are different, selecting said second ROM image pair;

booting said data processing system utilizing said third BIOS program stored by said third ROM image included in said second ROM image pair;

comparing contents of said third ROM image and said fourth ROM image; and in response to determining that said contents of said third ROM image and said fourth ROM image are identical, replacing said first ROM image and said second ROM image with said third ROM image.

11. The computer-implementable method according to claim 10, further comprising:

in response to determining contents of said first ROM image and said second ROM image are identical, comparing contents of said third ROM image and said fourth ROM image; and in response to determining said third ROM image is different from said fourth ROM image, replacing said third ROM image and said fourth ROM image with said first ROM image.

\* \* \* \* \*